United States Patent [19]

Bernardini

[11] Patent Number: 5,502,600
[45] Date of Patent: Mar. 26, 1996

[54] ELECTRONIC DEVICE FOR FAST DUPLICATION OF MAGNETIC TAPES

[76] Inventor: Bernardino Bernardini, Via Bartolozzi 11, Milan, Italy

[21] Appl. No.: 207,115

[22] Filed: Mar. 7, 1994

Related U.S. Application Data

[63] Continuation of Ser. No. 753,329, Aug. 30, 1991, abandoned.

[30] Foreign Application Priority Data

Aug. 31, 1991 [IT] Italy .................................. 21357A90

[51] Int. Cl.$^6$ ................................ G11B 5/86; G11B 3/64
[52] U.S. Cl. ............................................... 360/15; 369/84
[58] Field of Search .......................... 360/15, 13, 16, 360/17, 32; 369/84, 85, 83, 59, 60

[56] References Cited

U.S. PATENT DOCUMENTS 4,410,917  10/1983  Newdoll et al. ........................... 360/15
5,032,926  7/1991  Imai et al. .................................. 360/15

Primary Examiner—Ali Neyzari
Attorney, Agent, or Firm—Edgar H. Haug

[57] ABSTRACT

Devices for the duplication of industrial magnetic tapes, more particularly an electronic device for the fast duplication of magnetic tapes. The device, through a microprocessor, activates selecting circuits to control static memory cards of a memory bank. The selecting circuit generates proceeding signals and selecting signals which single out memory cells of the memory bank for writing and reading. These selecting signals and proceeding signals cause a subdivision of the cards in the memory bank, allotting a part of the memory for reading and another part for writing. The selecting and the proceeding signals are carried out through digital signals. The final digital signals are subjected to a digital-to-analog conversion.

9 Claims, 3 Drawing Sheets

ELECTRONIC DEVICE FOR FAST DUPLICATION OF MAGNETIC TAPES

This application is a continuation of application Ser. No. 07/753,329, filed Aug. 30, 1991 and now abandoned.

FIELD OF THE INVENTION

The present invention relates generally to devices for mass duplication of magnetic tapes and more particularly to such devices having static memory.

BACKGROUND OF THE INVENTION

In industrial duplication of magnetic tape, the sounds to be duplicated are initially recorded on professional magnetic tape, suited to systems that are proper for all forms of processing, (e.g. assembly, equalization, etc.). Eventually these tapes are recorded on stereophonic tracks. Typically each tape is loaded with just one program comprised of a number of single musical pieces, a single musical piece of suitable length or a selection of limited pieces.

The magnetic tapes to be produced on an industrial scale must have characteristics which make them suitable for use on commercial tape playback devices. The recording speed of these tapes is a fraction of the recording speed of the tapes prepared in recording studios. In this way, the quantity of tape necessary to record a program is reduced in size, while the quality of the produced sound is generally satisfactory for the normal commercial market.

In the manufacturing process, a copy is made from the professional tape onto an intermediate tape. The intermediate tape is recorded at a speed that is intermediate between the speed of the professional tape and the speed of the final products (e.g. audio or music cassettes). The intermediate tape has a plurality of recorded tracks, at least one for each stereophonic program, and includes all the processing necessary to achieve the final desired sound. This tape is usually called a "master" tape.

The master tape, which is recorded in analog form, is then reproduced (played back) at a speed that is much higher than the speed at which the tape was recorded (generally 64 times higher, but sometimes much more). If the speed is, for example, 64 times greater than the speed at which the final product will be played back to a listener, a an hour of sound is copied in about 28 seconds. Under this method, the frequencies of the sound are automatically multiplied by the same speed factor.

The master tape is usually in the form of a loop. This permits it to be read continuously. Each full turn of the tape represents one entire program which, when it is played back on a "loop bin," is simultaneously recorded on a recorder generally called a "slave." Typically, a plurality of these slaves are connected to the outputs of the loop bin to obtain multiple copies of the same program, simultaneously. Thus, the number of copies of the same program corresponds, for each passage of the master tape, to the number of the slaves connected to the outputs of the loop bin.

In summary, sounds are initially recorded on professional tapes in a manner that permits them to receive all the necessary processing to make them duplicatable. Then the sounds are transferred, according to current standards, onto an intermediate or master tape. At this point, industrial production is begun.

One drawback of the above-described prior art is that such duplicating systems have several moving parts which are subject to wear. The primary part which is subject to this wear is the master tape. This tape wears out because it is subjected to a large number of high speed passages over a reading head during the duplication process. Over time, the tapes undergo changes which gradually erode the level of quality of the original recorded sound.

In actual production, programs of medium length are typically alternated with very short programs. In fact, from an examination of the programs which are generally duplicated, it has been noted that the majority of the programs have lengths which are shorter than half of the maximum allowed length. Only a very small fraction of programs actually approach the maximum allowed length. This means that the capacity of the tape, on which the programs to be duplicated are recorded, is not entirely used.

The current trend in the digitization of recorded sound has encouraged the manufacturers of recorded sounds to spread the use of digital systems to all the stages of sound duplication, including the recording of the final product, such as analog audio cassettes. One problem with digitally recorded sounds is that there is no easy way to copy such a recording at speeds higher than the speed at which the sounds were originally recorded. This is because of the presence of movable mechanical members in players/recorders.

While the duplication carried out by the prior art allows the programs to be duplicated at higher speeds than the original recorded speed, two basic limits still exist which have not been overcome. These limits essentially are the poor utilization of the full length of usable master tape on which the programs are recorded, and the qualitative degeneration to which the moving master tape is subjected during its high speed playback of the program to be duplicated.

Therefore, the prior art allows the reproduction of the information of the analog master tape, the corresponding recording on magnetic media, the analog-to-digital conversion and vice-versa and the recording, in an analog form, on the final support. A microprocessor runs all the foregoing phases, including controlling the synchronization of the recording of the data on the magnetic media and the analog-to-digital and digital-to-analog conversion.

SUMMARY OF THE INVENTION

It is an object of the present invention to eliminate the above mentioned drawbacks.

The present invention uses static memory to obtain better utilization of the memory support and avoids the utilization of movable members.

In accordance with the present invention, it is possible to carry out the duplication of magnetic tapes which operate at frequencies different from the standard frequency.

DESCRIPTION OF THE PREFERRED EMBODIMENT

Figure 1:
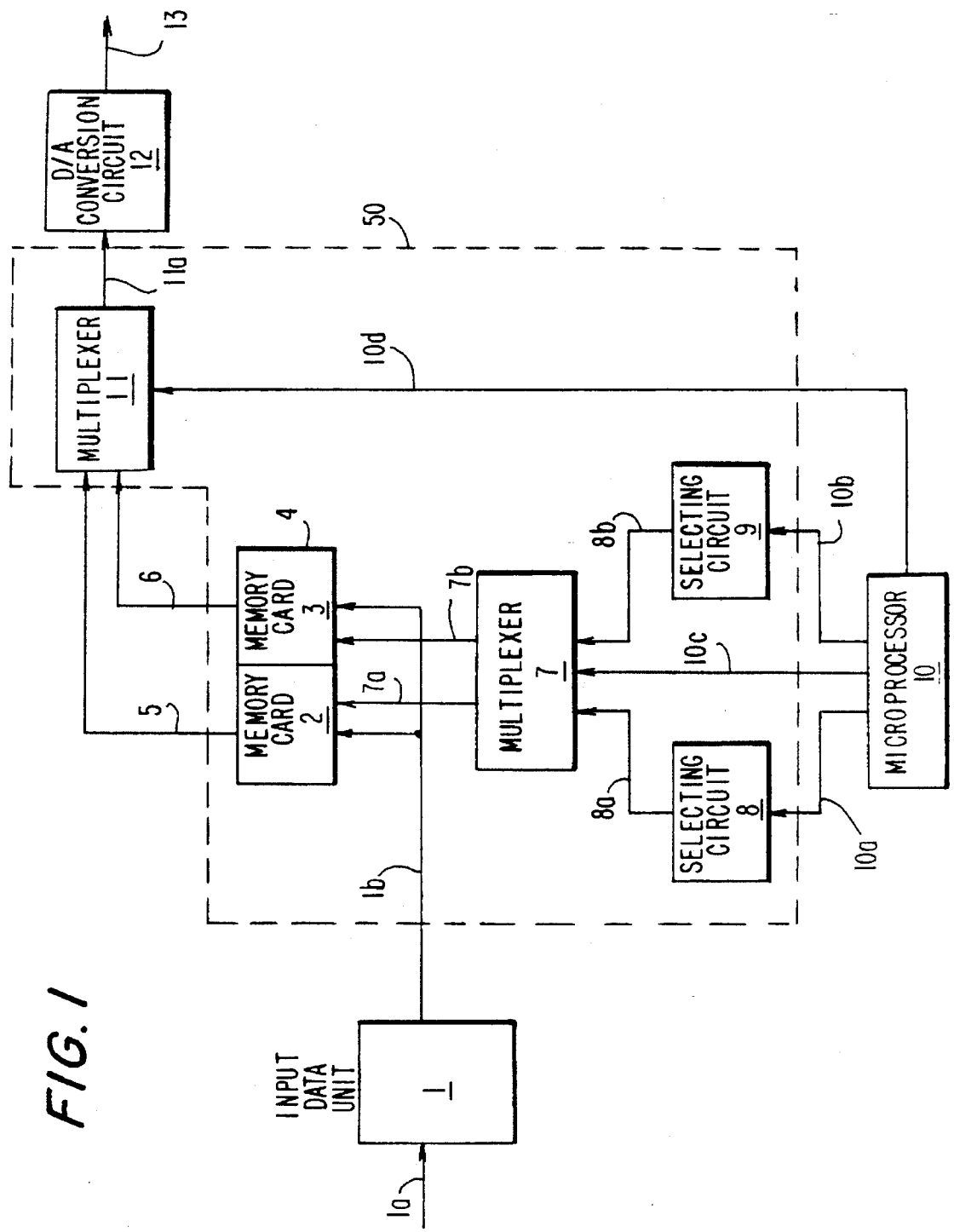
FIG. 1 is a block diagram of a preferred embodiment of the present invention.

Referring to FIG. 1, an input data unit 1, which can be a digital audio tape player/recorder, receives digital data 1a (sounds), and records the data 1a on an appropriate recording medium.

Data 1b is output from unit 1. This data 1b is the sounds which are then stored in the memory bank 4 of the present invention. The actual device of the present invention, is represented by the elements enclosed within dashed line 50 with interacting a microprocessor 10.

Data 1b is sent to a memory bank 4 which, in one preferred embodiment of the present invention, is physically formed by memory cards 2 and 3. The number of cards comprising the memory bank can be multiplied depending on the capacity of the storage that is needed by the duplication process. Additional cards are usually used as reserve memory, in case the partition selected for the memory of the program to be duplicated is insufficient.

The memory cards 2 and 3 generate digitized output data 5 and 6, which is ultimately sent via output signal 13 to a final recordation means for fixation on a playback medium. (usually magnetic tape which is subsequently loaded into a cassette).

The memory bank 4 is run through a single microprocessor 10, that, by means of signals 10a, 10b, 10c and 10d, controls the selecting circuits 8 and 9, switching unit 11 and a multiplexer 7, respectively.

The selecting circuits 8 and 9 generate signals 8a and 8b, which are used by the multiplexer 7 to address and choose the location in the corresponding memory cards 2 and 3, through output signals 7a and 7b.

The signal 10d of the microprocessor 10 activates the multiplexer 11 which outputs digital signals 11a. These signals 11a, through a digital-to-analog conversion circuit 12, are sent via signal 13 to the final recordation means as analog signals.

Figure 2:
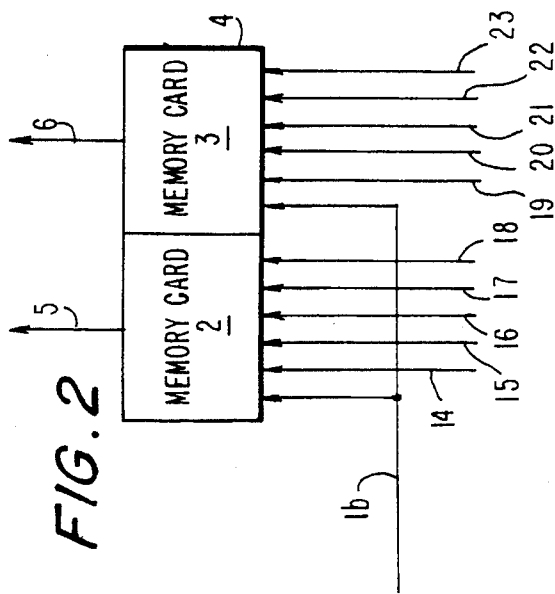
FIG. 2 is a block diagram illustrating driving signals which go to a memory bank located in the device of the present invention as shown in FIG. 1.

The signals 7a and 7b (shown in FIG. 1), which are sent to the memory cards 2 and 3, are shown in greater detail in FIG. 2 as signals 14–23.

Signals 14, 15, 16, 17 and 18 are the signals which enter the memory card 2. More specifically, signal 14 comprises address selecting signals. Some of the signals 14 go directly to single memory cells (not shown) of the memory card 2. Others are used for the selection of the particular memory card 2 or 3 inside the memory bank 4. Signal 15 comprises writing and reading driving signals for the memory card 2. Signals 16 and 17 comprise timing signals necessary to the memory card 2 for carrying out the writing and reading phases. Signal 18 comprises a proceeding signal for the entire memory card 2.

Signals 19 to 23, flowing into memory card 3 are the same kind of signals as signals 14 to 18, respectively, flowing into memory card 2.

Figure 3:
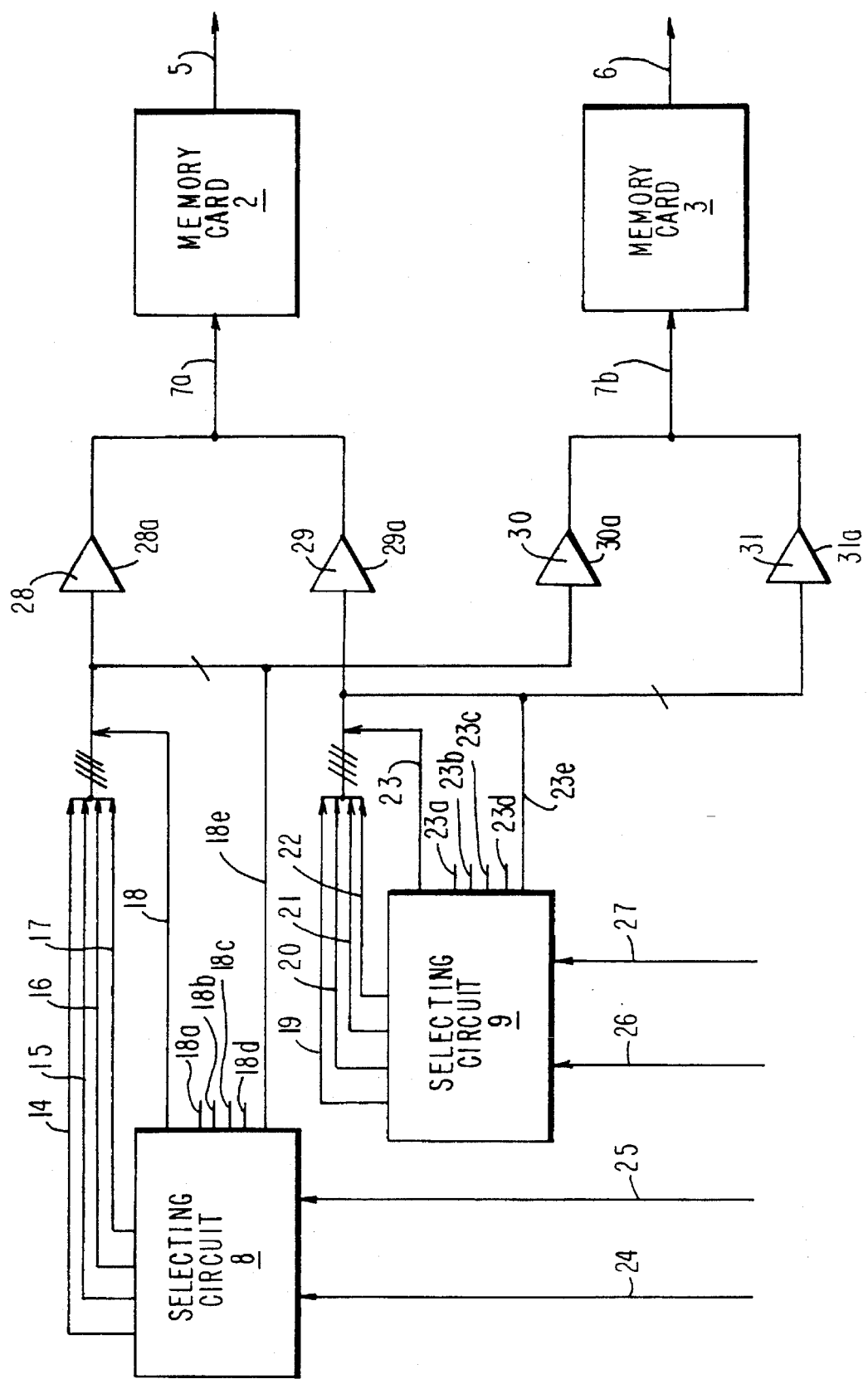
FIG. 3 is a block diagram illustrating address and proceeding signals which activate desired memory cells of the device of the present invention.

The signals from 14 to 18 and from 19 to 23 and the selecting circuits 8 and 9 are shown in still greater detail in FIG. 3.

Signals 24 and 25 which make up signal 10a in FIG. 1, constitute the input for the selecting circuit 8. Signal 24, is a clock signal and acts as the timing clock to give cadence to the timing and driving signals 25 coming from the microprocessor 10. As with respect to selecting circuit 9, signals 26 and 27 are, respectively a clock signal and a driving signal of the microprocessor 10.

Signals 8a and 8b are the output of selecting circuits 8 and 9 and the input to the multiplexer 7. These signals correspond to signals 7a and 7b respectively, which comprise the output of multiplexer 7.

In FIG. 3, proceeding signals 18 and 18a, the output of selecting circuit 8, represent the different enabling signals. These enabling signals depend on decoding the memory addresses which are chosen according to the structure of the memory located in the device 50.

More specifically, since each memory address is different, specific enabling signals are necessary. The signals 18 and 18a, 23 and 23a are generated by the selecting circuits 8 or 9 with reference to the corresponding memory field of the memory cards 2 and 3.

Each of the proceeding signals 18 to 18e for selecting circuit 8 and the proceeding signals 23 to 23e for selecting circuit 9 goes to a selecting circuit, containing gate circuits 28, 29, 30 and 31 of a three-state buffer, which, operating in parallel, determine the selection, towards the corresponding memory cards 2 or 3, through signals 28a, 29a, 30a and 31a, respectively. The signals 28a, 29a, 30a and 31a are the selecting signals given by the microprocessor 10 and are a function of the desired partition. In this way, the output signal 7a or 7b, corresponding to memory card 2 or 3, addresses a specific memory cell without causing interference.

Briefly stated, the above mentioned signals represent the selecting signals for locating the desired partition in the memory cards 2 and 3 depending on whether reading or writing is desired in the same memory location.

Figure 4:
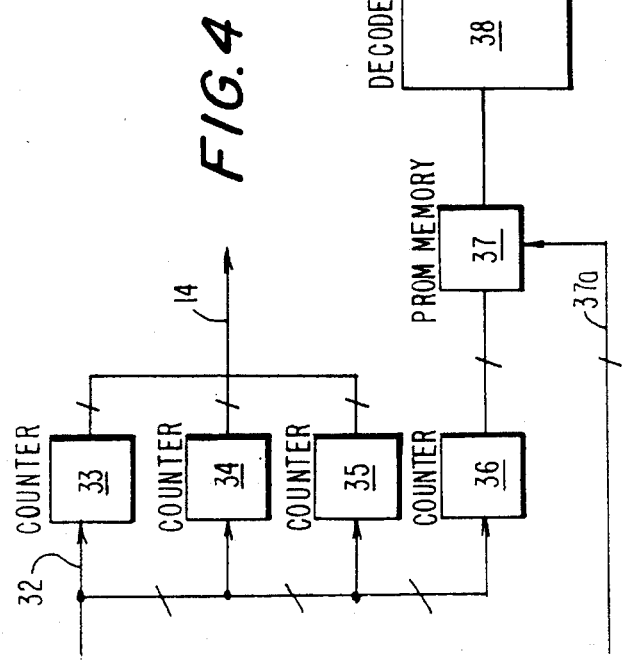
FIG. 4 is a block diagram illustrating a selection of proceeding signals which activate a memory bank of one embodiment of the present invention.

FIG. 4, shows a portion of the proceeding signals in detail. In this figure, a clock signal 32 activates corresponding counters 33, 34, 35 and 36, which generate an address selecting signal 14 for requesting the memory location. However, the signals 18–18e are a function of the firmware loaded in PROM memory 37, activated by a signal 37a, coming from the microprocessor 10. This firmware contains the coded memory addresses as a function of the desired partition.

The address that is determined by the signal 14, is a function of the decoded address which has the highest value of all the addresses of the memory, according to the circuit structure shown in FIG. 4. A corresponding decoder 38 generates the sequence of proceeding signals from 18 to 18e, which are output from the selecting circuit 8. (The same structure and operation is present with respect to the selecting circuit 9 with signals 23 to 23e.) Thus, varying the generating sequence of the proceeding signals, the memory addresses are not always counted from the first address, but rather from the address necessary for establishing the partition in the memory that is desired for the duplication process.

Figure 5:
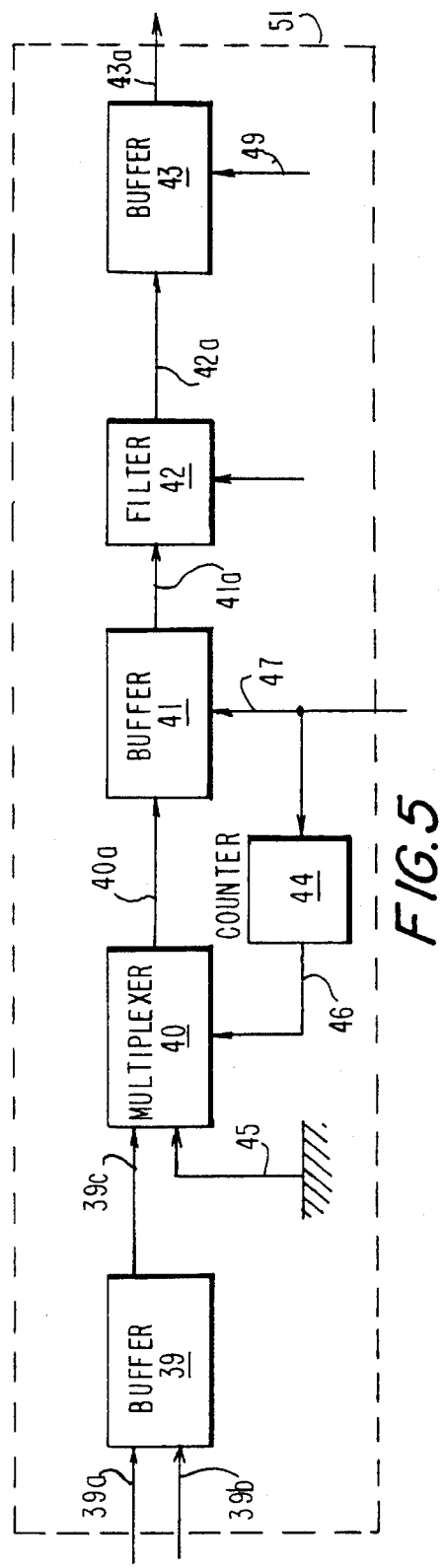
FIG. 5 is a block diagram of an embodiment of the present invention for changing the variation of a sampling frequency of an input digital data flow.

FIG. 5 shows another embodiment of the present invention. In this embodiment a variation of the sampling frequency of the flow of input data 39a through sampling circuits 51 is accomplished. At the input there are data clock signals 39b. The data signals 39a are loaded into a buffer 39, that generates a signal 39c that is switched by a multiplexer 40. The multiplexer 40 receives an input reference signal 45, represented by a sample signal with no value, and a signal 46 coming from counter 44.

The multiplexer 40 outputs a signal 40a that loads another buffer 41. The buffer 41 receives a clock signal 47, multiplied by a new sampling coefficient that represents the frequency variation. In this way, signal 41a is generated and then filtered by a filter 42. The filter 42 is a digital filter subjected to timing by a clock frequency signal 48 created by the input data clock signals 39b multiplied for the above mentioned frequency variation.

There is a last buffer 43 where new signals 42a are loaded and a new output signal 43a is carried out through a sampling frequency signal 49. Signal 43a represents the new desired sampling that is a submultiple of the input frequency.

In accordance with the present invention, the device 50 has no movable parts, only static elements. The static memory cards 2 and 3 are loaded, by means of the input data unit 1, with the sounds, which must then be unloaded and recorded via signal 13 with the final recordation means. The memory cards 2 and 3 can be partitioned, through selecting signals coming from the selecting circuits 8 and 9 and can be switched, through an electronic switching circuit represented by the multiplexer 7, that is directly connected to the inputs of the memory cards 2 and 3. Similarly, it is necessary to have another multiplexer (switching circuit 11) at the output of the memory cards 2 and 3, to distribute the signals 5 and 6 output by memory cards 2 and 3.

As shown in FIG. 2, at the input of the memory card 2 there is an address selecting signal 14. Part of this signal 14 goes directly to the single memory cells (not shown) of the memory card 2 while another part of the signal, through a decoder 38 (shown in FIG. 4) goes to the same card 2. The signals 15 to the memory card 2 are writing and reading driving signals for the memory, while signals 16 and 17 represent timing signals necessary for the memories to follow the different writing and reading cycles. Signal 18 is a proceeding signal for the entire card 2. Input signals 19, 20, 21, 22, 23 to memory card 3 are for the same purpose and have the same function as input signals 14–18.

When a memory card 2 or 3 is subjected to the reading phase, the input data flows to all the memory cards (in this case 2 and 3) regardless of their reading phase or writing phase status. Memory cards 2 and 3 can be connected in parallel, because each card outputs the data 5 and 6 only when it is enabled during the reading phase. Thus, if it is desired to write some data in one memory bank and to read other data from another memory bank, there is no conflicting data flowing from both memory cards 2 and 3.

The multiplexer 7 is responsible for the partition of the memory cards 2 and 3, between the writing signals and the reading signals. This occurs through programmed switching from the driving signals coming from the microprocessor 10 and the address coming from the selecting circuit 8 and 9.

The output signal frequency of the memory cards 2 and 3 is determined by the clock signal 24 for selecting circuit 8, and the clock signal 26 for selecting circuit 9. The timing signals come from the microprocessor 10.

Selecting signals $A_1$ and $A_n$, output by the selecting circuits 8 and 9, are given by the microprocessor 10. The selecting signal is represented in FIG. 3 by signals 28a, 29a, 30a and 31a.

If, for example, a 4+6 partition were desired with memory cards 2 and 3, signals from $A_1$ to $A_{10}$ would be generated, with the signals $A_1$ to $A_4$ set to zero and $A_5$ to $A_{10}$ having a value of one. This would enable certain memory locations while disabling others, allowing a partition of memory cards 2 and 3.

Each selecting circuit 8 and 9 generates a quantity of enabling signals equal to the number of memory cards located in the device. (In the preferred embodiment disclosed herein there are two cards 2 and 3 and thus, two enabling signals).

The data 5 and 6, output from memory cards 2 and 3, is present when a reading cycle is carried out with the enabled memory card, otherwise the output has a high impedance. When the output has a high impedance the memory card is not enabled and it can be ascertained that the memory card is being subjected to a writing cycle or is in a stand-by condition. As noted above, when the memory card 2 or 3 is subjected to a reading cycle, the presence of the input data 1b is of no significance.

Signals 7a and 7b constitute input to memory cards 2 and 3. These signals are generated by circuits 28, 29, 30 and 31 as a function of the proceeding signals 18 to 18e, and 23 to 23e of selecting circuits 8 and 9. In this way, signals 28a, 29a, 30a and 31a determine the signal of greatest value in relation to the desired memory partition.

The proceeding signals are shown in detail in the circuits in FIG. 4. The decoder decodes the address which has the highest value among the memory addresses according to a cascade represented by the counters from 33 to 36. In this way, by means of PROM 37, it is possible to change the generating sequence of the proceeding signals. In fact, referring to the 4+6 example cited above, the selecting circuit 9 must generate a selecting signal which corresponds to the lowest address that corresponds to the proceeding signal corresponding to signal $A_5$, while the selecting circuit 8 must generate a selecting signal corresponding to the first address, that, in turn, corresponds to the first proceeding signal. The microprocessor 10 is responsible for the actual bits which provide the appropriate selections.

Therefore, referring to FIG. 3, a selecting signal is generated that is a function of the signal having the highest value between the circuit 28 and the circuit 29 (or between the circuits 30 and 31). This selecting signal addresses the desired partition in the memory card 2 (or 3) and therefore the corresponding output data 5 (or 6), to achieve the desired effect.

FIG. 4, shows the memory addresses for singling out the memory cell on which the information is to be loaded, that is the data or the signals (sounds). In this way, through the counters 33 to 36, as a function of the decoder 38 and of the PROM 37, enabled by a selecting signal 37a, the address output signals are determined. These output signals then go to the corresponding memory cards 2 or 3 in order to single out and to partition the memory card, as desired, between writing and reading phases.

Given the partition as shown, that is, digitization by zeros and ones, it is possible to partition, the memory cards 2 and 3. Moreover, even though it is not shown herein, it is possible to reserve part of card 2 or 3, or both, as backup memory (reserve memory) in the event that the set up partition is insufficient in relation to the length of the program to be loaded.

In this way, the present invention attains the intended purposes. In fact, the use of static memory cards 2 and 3 completely avoids the use of movable master loop tapes, which diminish in quality, over time, as the tape is subjected to wear. The static memory cards insure perfectly consistent quality from the original input to the final output which is sent via signal 13 to the final recordation means.

As discussed above, by means of the microprocessor 10, the selecting circuits 8 and 9 and the multiplexer 7, it is possible to partition the memory cards 2 and 3, reserving part of them for reading and part for writing. This allows more efficient use of the memory cards and speeds up the duplication method, by eliminating start-up dead time due to the digital loading of the input data unit 1. In fact, the output unit can operate at high speed, while the input data unit loads the next program. In other words, the reading phase and writing phase can be carried out simultaneously for different data, in different memory partitions.

It is also possible to vary the sampling frequency of the flow of the input data 1*b* in order to conform to any necessary standards. Typically, however, the digital programs are loaded at the standard frequency of 44.1 KHz in a buffer 39 (shown in FIG. 5), located at the output of the data unit 1.

In the period corresponding to the frequency of 44.1 KHz of the input flow 39*a* many sampling frequencies are fixed and, in correspondence to these sampling frequencies, times are singled out, which are considered sample times of a value that is equal to zero.

The sequence of the sample times, comprising the sample times of value equal to zero, is timed at a frequency that is n time greater, through a clock signal 47, and is filtered by the filter 42. This filter 42 is a low-pass digital filter with a cutoff frequency equal to the maximum audio frequency that is intended to be used. At the output of filter 42, the sample signals of the input signal are rebuilt, and are output as signal 42*a* at a different timing from the input timing 39*c*.

FIG. 5 shows the input buffer 39 before the sampling. Buffer 41 is loaded with the data multiplied by the multiplexer 40 with a clock frequency that is n times greater than the input frequency of the signals 39*b*. This is achieved using the counter 44, the reference signal 45 and the clock signal 47.

The signals 41*a* are filtered by the filter 42 operating at the frequency of clock signal 48. This frequency is equal to the frequency entering the buffer 41. In this way, the end buffer 43 is loaded with data which is timed by the frequency of the signal 49. The frequency of signal 49 is the frequency of the buffer 41 divided by the desired sampling points. For example, if n equals 8, the new frequency is 44.1×8/9, or 39.1 KHz. This would be the new desired sampling frequency which might be appropriate for appliances which are different from standard ones.

By putting the sampling circuits, within dashed line 51, at the input between the input data unit 1 and the device 50, it is possible to operate the device according to the present invention with frequencies different from the standard frequency, so that, with the same memory capacity, it is possible to load more data in memory cards 2 and 3.

While reference has been made to certain hardware, functional elements and parameters, these are meant as illustrative only and one of skill in the art may alter such elements without departing from the spirit and intent of the present invention.

What is claimed is:

1. An apparatus for the duplication of magnetic tape comprising:

means for providing data input;

parallelly arranged memory means, connected to said data input means, for enabling the simultaneous reading of the data of at least one previously stored program and the writing of the data of at least one other program;

address control means, connected to said memory means for designating storage locations for said input data in said memory means, wherein said address means comprises at least one selecting means, responsive to output signals received from a microprocessor, for providing a plurality of output signals, wherein said selecting means comprises a plurality of three-state buffer type gate circuits providing a plurality of output signals, in parallel, wherein said signals activate and select the desired subdivision of said cells of said static memory cards;

at least one address switching circuit, connected to said selecting means and said microprocessor, wherein said address switching circuit provides input signals to said memory means; and digital-to-analog conversion means, receiving digital output signals from said memory means and converting said digital signals to analog output signals; and means for recording said analog signals output from said digital-to-analog conversion means.

2. An apparatus according to claim 1, having at least one said selecting means corresponding to each said static memory card.

3. An apparatus according to claim 1, wherein each said selecting means comprises two parallely disposed gate circuits, which circuits, through signals from said microprocessor, single out the desired subdivision of said cells of said static memory cards.

4. An apparatus according to claim 2, wherein said switching circuit is for singling out the memory card corresponding to said selecting means.

5. An apparatus for the duplication of magnetic tape comprising:

means for providing data input;

parallelly arranged memory means, connected to said data input means, for enabling the simultaneous reading of the data of at least one previously stored program and the writing of the data of at least one other program;

address control means, connected to said memory means for designating storage locations for said input data in said memory means, wherein said address means comprises at least one selecting means, responsive to output signals received from a microprocessor, for providing a plurality of output signals, and wherein at least one of said plurality of output signals from said selecting means is an address selecting signal which is determined through a plurality of counters as a function of a decoder and firmware loaded in a PROM memory, wherein said firmware is activated by a signal from said microprocessor;

at least one address switching circuit, connected to said selecting means and said microprocessor, wherein said address switching circuit provides input signals to said memory means; and digital-to-analog conversion means, receiving digital output signals from said memory means and converting said digital signals to analog output signals; and means for recording said analog signals output from said digital-to-analog conversion means.

6. An apparatus for duplicating magnetic tape comprising:

means for providing data input wherein said data input is at a predetermined sampling frequency; sampling means for sampling said input data at one or more selected frequencies;

memory means comprising at least one memory card;

address control means connected to said memory means for partitioning said at least one memory card to enable the simultaneous reading and writing of data, wherein said reading or writing occurs at one or more selected frequencies;

conversion means for converting digital data to analog data; and recording means, connected to said conversion means, for recording said output analog information.

7. An apparatus according to claim 6, wherein said sampling means adjusts said sampling frequency to correspond to said predetermined sampling frequency of said input data.

8. An apparatus according to claim 7, wherein said sampling frequency is selected through a digital filter located between two buffers.

9. An apparatus according to claim 8, wherein a second sampling frequency signal is sent to said digital filter through an electronic counter that multiplies the value of the input frequency by a desired frequency value to determine, at the output of said counter, said second sampling frequency signal as a submultiple of the input frequency.

* * * * *